United States Patent
Gomi

(10) Patent No.: US 9,760,890 B2
(45) Date of Patent: Sep. 12, 2017

(54) PERMISSION MANAGEMENT APPARATUS AND PERMISSION MANAGEMENT METHOD

(71) Applicant: YAHOO JAPAN CORPORATION, Tokyo (JP)

(72) Inventor: Hidehito Gomi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 963 days.

(21) Appl. No.: 14/029,063

(22) Filed: Sep. 17, 2013

(65) Prior Publication Data

US 2014/0081746 A1    Mar. 20, 2014

(30) Foreign Application Priority Data

Sep. 19, 2012  (JP) ................................. 2012-205871

(51) Int. Cl.
| | | |
|---|---|---|
| G06Q 99/00 | (2006.01) | |
| G06Q 20/40 | (2012.01) | |
| G06Q 20/34 | (2012.01) | |

(52) U.S. Cl.
CPC ......... *G06Q 20/409* (2013.01); *G06Q 20/354* (2013.01)

(58) Field of Classification Search
USPC .................................................. 705/50–79
See application file for complete search history.

(56) References Cited

U.S. PATENT DOCUMENTS 8,751,380 B2 *  6/2014  Harvey ................. G06Q 10/00
                                                           705/14.23
9,195,984 B1 * 11/2015  Spector ................ G06Q 20/367
                    (Continued)

FOREIGN PATENT DOCUMENTS

| JP | 2003-150849 A | 5/2003 |
| JP | 2005-115597 A | 4/2005 |

(Continued)

OTHER PUBLICATIONS

Jan. 12, 2016 Office Action issued in Japanese Patent Application No. 2014-052224.

(Continued)

*Primary Examiner* — James D Nigh
*Assistant Examiner* — Margaret Neubig
(74) *Attorney, Agent, or Firm* — Oliff PLC

(57) ABSTRACT

A registration accepting unit accepts registration of a card. A storage unit stores use permission information indicating a disabled state of use permission of the registered card. An instruction accepting unit accepts a use permission enabling instruction of the card from a user terminal. A providing unit provides the user terminal with code information associated with the card for which the use permission enabling instruction has been issued. A changing unit enables the use permission of the card, for which the use permission enabling instruction has been issued and which is stored in the use permission information, for a predetermined period. When receiving the code information from an in-store device installed in a stored, a notifying unit notifies the facility device of whether the use permission of the right that is stored in the use permission information in association with the code information is enabled or disabled.

8 Claims, 11 Drawing Sheets

(56) References Cited

U.S. PATENT DOCUMENTS

| | | | |
|---|---|---|---|
| 2010/0125495 A1* | 5/2010 | Smith | G06Q 20/3223 |
| | | | 705/14.23 |
| 2010/0191605 A1 | 7/2010 | Nuttall et al. | |
| 2012/0095911 A1* | 4/2012 | Ibasco | G06Q 20/10 |
| | | | 705/39 |
| 2014/0046784 A1* | 2/2014 | Prakash | G06Q 20/36 |
| | | | 705/17 |

FOREIGN PATENT DOCUMENTS

| | | |
|---|---|---|
| JP | A-2007-12009 | 1/2007 |
| JP | 2012-113467 | 6/2012 |
| JP | A-2012-515380 | 7/2012 |
| JP | 5507641 B2 | 5/2014 |
| WO | 01/97118 A1 | 12/2001 |

OTHER PUBLICATIONS

Apr. 14, 2015 Office Action issued in Japanese Application No. 2014-052224.

Decision of a Patent Grant issued in Japanese Application No. 2012-205871 dated Mar. 4, 2014 (with translation).

Sep. 6, 2016 Office Action issued in Japanese Patent Application No. 2014-052224.

* cited by examiner

FIG.3

| USER ID | PASSWORD | NAME | ADDRESS |
|---------|----------|------|---------|
| 0001 | XXXX | A | XXXX |
| 0002 | XXXX | B | XXXX |
| ⋮ | | | |

FIG.4

| USER ID | ID INFORMATION | TYPE | USE PERMISSION |
|---------|----------------|------|----------------|
| 0001 | XXXXA | POINT CARD | DISABLED |
| 0002 | XXXXB | CREDIT CARD | ENABLED |
| ⋮ | | | |

| USER ID | ID INFORMATION | TICKET | DATE AND TIME |
|---------|----------------|--------|------------------|
| 0001 | XXXXA | XXXXXY | 2012/XX/XX 12:00:00 |
| 0002 | XXXXB | XXXXXZ | 2012/XX/XX 12:05:05 |
| ⋮ | | | |

PERMISSION MANAGEMENT APPARATUS AND PERMISSION MANAGEMENT METHOD

CROSS-REFERENCE TO RELATED APPLICATIONS

The present application claims priority to and incorporates by reference the entire contents of Japanese Patent Application No. 2012-205871 filed in Japan on Sep. 19, 2012.

BACKGROUND OF THE INVENTION

1. Field of the Invention

The present invention relates to a permission management apparatus and a permission management method.

2. Description of the Related Art

A user uses the rights granted by a service provider in a store. For example, the user carries various cards, such as a credit card issued by a credit company and a point card issued by a store that offers a point service, and exercises the rights according to the cards, such as payment by the credit card and use of points, by presenting the cards in the store. However, in some cases, somebody else may steal the user's identity and exercise the user's rights. For example, if the user is to exercise the rights by using a card, the user carries the card; therefore, there is a risk in that the user may lose the card and the lost card may be used for fraud by a person impersonating the user.

Therefore, as a technology for preventing unauthorized use of a lost card, for example, a technology has been proposed in which a query is sent by electronic mail to a bank server before a cash card is used and a lock is released so that the cash card can be used with an automated teller machine (ATM) (for example, Japanese Patent Application Laid-open No. 2007-12009).

However, in the conventional technology, it is necessary to construct a system to release the lock for each type of the cards, and a store needs to cope with each of the systems. Furthermore, the user needs to learn and manage a rule to release the lock individually for each of the cards. Namely, in the conventional technology, to prevent unauthorized use of the rights, it is necessary to construct a system to release the lock for each of the rights to be managed and a user needs to learn rules to release the respective locks, which is cumbersome.

SUMMARY OF THE INVENTION

It is an object of the present invention to at least partially solve the problems in the conventional technology.

According to one aspect of an embodiment of the present invention, a permission management apparatus includes: a registration accepting unit that accepts registration of rights information on a right to use a service provided by a service provider in a facility; a storage unit that stores therein use permission information indicating a disabled state of use permission of the right for which registration of the right information has been accepted by the registration accepting unit; an instruction accepting unit that accepts a use permission enabling instruction to enable the right to be exercised in the facility from a user terminal; a providing unit that provides the user terminal with code information associated with the right for which the use permission enabling instruction has been accepted by the instruction accepting unit; a changing unit that enables the use permission of the right, which is stored in the use permission information and for which the use permission enabling instruction has been accepted by the instruction accepting unit, for a predetermined period; and a notifying unit that, when receiving the code information from a facility device installed in the facility, notifies the facility device of whether the use permission of the right that is stored in the use permission information in association with the code information is enabled or disabled.

According to another aspect of an embodiment of the present invention, a permission management method executed by a computer, the method includes: accepting registration of rights information on a right to use a service provided by a service provider in a facility; storing use permission information indicating a disabled state of use permission of the right for which registration of the right information has been accepted at the accepting the registration; accepting a use permission enabling instruction to enable the right to be exercised in the facility from a user terminal; providing the user terminal with code information associated with the right for which the use permission enabling instruction has been accepted at the accepting the instruction; enabling the use permission of the right, which is stored in the use permission information and for which the use permission enabling instruction has been accepted at the accepting the instruction, for a predetermined period; and notifying, when receiving the code information from a facility device installed in the facility, the facility device of whether the user permission of the right that is stored in the use permission information in association with the code information is enabled or disabled.

According to another aspect of an embodiment of the present invention, computer-readable recording medium having stored therein a permission management program for causing a computer to execute a process, the process includes: accepting registration of rights information on a right to use a service provided by a service provider in a facility; storing use permission information indicating a disabled state of use permission of the right for which registration of the right information has been accepted at the accepting the registration; accepting a use permission enabling instruction to enable the right to be exercised in the facility from a user terminal; providing the user terminal with code information associated with the right for which the use permission enabling instruction has been accepted at the accepting the instruction; enabling the use permission of the right, which is stored in the use permission information and for which the use permission enabling instruction has been accepted at the accepting the instruction, for a predetermined period; and notifying, when receiving the code information from a facility device installed in the facility, the facility device of whether the user permission of the right that is stored in the use permission information in association with the code information is enabled or disabled.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a data structure of a user information table according to the first embodiment;

FIG. 4 is a diagram illustrating an example of a data structure of rights information according to the first embodiment;

DETAILED DESCRIPTION OF THE PREFERRED EMBODIMENTS

Exemplary embodiments (hereinafter, referred to as "embodiments") of a permission management apparatus, a permission management method, and a permission management program according to the present invention will be explained in detail below with reference to the accompanying drawings. The present invention is not limited to the embodiments below. The embodiments may be combined appropriately as long as the processing contents do not conflict with each other. In the following, an example will be explained that a store serves as a facility that provides a service and a right according to a card is exercised as a right granted by a service provider.

First Embodiment

1-1. System Configuration

Figure 1:
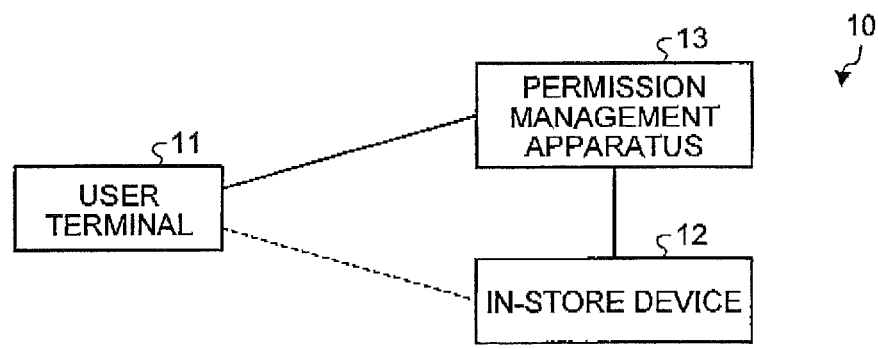
FIG. 1 is a schematic diagram illustrating a configuration of a system according to a first embodiment.

A first embodiment will be explained below. In the first embodiment, a system will be explained in which pieces of information on various cards owned by each of users are registered as rights information on a right in a permission management apparatus, and when a user exercises the right with a card, code information for verifying permission for the card is acquired from the permission management apparatus and a store verifies the permission for the card based on the code information. FIG. 1 is a schematic diagram illustrating a configuration of the system according to the first embodiment. As illustrated in FIG. 1, a system 10 includes a user terminal 11, an in-store device 12, and a permission management apparatus 13. The user terminal 11 and the permission management apparatus 13 are connected so as to communicate with each other via a network (not illustrated), and the in-store device 12 and the permission management apparatus 13 are connected so as to communicate with each other via the network (not illustrated). The network may be any communication network, such as the Internet, a local area network (LAN), a virtual private network (VPN), or a mobile communication network, regardless of whether it is wired or wireless. In the example in FIG. 1, the connection between the user terminal 11 and the permission management apparatus 13 and the connection between the in-store device 12 and the permission management apparatus 13 are denoted by solid lines indicating online states, and the connection between the user terminal 11 and the in-store device 12 is denoted by a dashed line indicating an offline state. Incidentally, while FIG. 1 illustrates an example in which the system 10 includes one user terminal 11 and one in-store device 12, the disclosed system is not limited to this example and may include an arbitrary number of the user terminals 11 and the in-store devices 12. Furthermore, the system 10 may include a plurality of the permission management apparatuses 13.

The user terminal 11 is a terminal device of a user. For example, the user terminal 11 may be a desktop personal computer (PC), a tablet PC, a notebook PC, a mobile phone, a smartphone, or a personal digital assistant (PDA).

The in-store device 12 provides a service according to a right that is granted to a user by a service provider. For example, the in-store device 12 is installed in a store that provides a service using a card, and may be, for example, a point-of-sale (POS) terminal that performs transaction processing in the store. The in-store device 12 may be an information processing apparatus, such as a desktop PC, a tablet PC, or a notebook PC. Examples of the service using the card include payment by a credit card, provision of incentives, such as assignment of points, use of points, or discount, or provision of benefits, such as goods or special information. A user requests the store to allow the user to exercise a right according to a card by presenting the card. In the store, when the exercise of the right according to the card is requested, a query is sent to the permission management apparatus 13 to verify the permission for the card and a service is provided according to the card when the use is permitted. For example, when the user presents a point card to request use of accumulated points, the store verifies the permission for the card, and if the use is permitted, performs transaction processing by discounting the price of a product by the amount corresponding to the accumulated points.

The permission management apparatus 13 is an information processing apparatus, such as a server computer, that accepts registration of rights information on a right from the user, and manages permission of use of the right (use permission of the right) for which registration of the rights information has been accepted. For example, the permission management apparatus 13 accepts registration of various types of information on cards from the user and manages the permission to use the registered cards. Furthermore, the permission management apparatus 13 accepts an instruction to enable the right to be exercised from the user. When receiving the instruction to enable the right to be exercised from the user, the permission management apparatus 13 enables the use permission of the right for which an instruction to enable the use permission (use permission enabling instruction) has been issued, for a predetermined period, and provides the user with code information associated with the right for which the use permission enabling instruction has been issued. For example, the permission management apparatus 13 accepts, from a user, a use permission enabling instruction on a card with which a right is to be exercised. When receiving the use permission enabling instruction on the card, the permission management apparatus 13 enables the use permission of the card for which the use permission enabling instruction has been issued, for a predetermined period, and provides the user with code information associated with the card. Hereinafter, in the first embodiment, the code information may also be referred to as a "ticket". When receiving the code information, the permission management apparatus 13 sends a notice of whether the use permission is enabled or disabled based on the use permission of the right associated with the code information. For example, when receiving a ticket from the in-store device 12 installed in a store, the permission management apparatus 13 notifies the in-store device 12 whether the use permission of the card is enabled or disabled.

Figure 2:
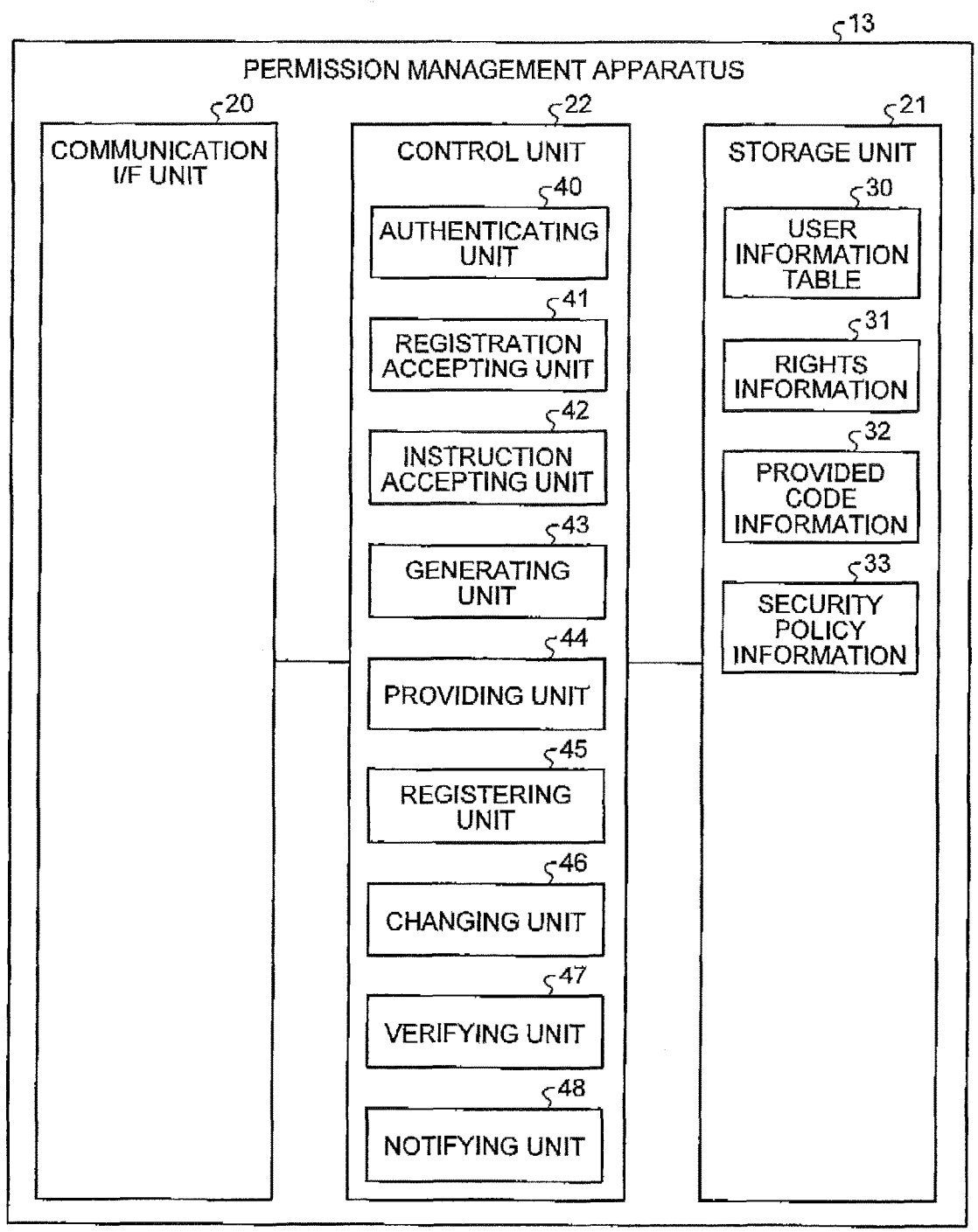
FIG. 2 is a diagram illustrating a functional configuration example of a permission management apparatus according to the first embodiment.

1-2. Configurations of Permission Management Apparatus, in-Store Device, and User Terminal The user terminal 11, the in-store device 12, and the permission management apparatus 13 according to the first embodiment will be explained in detail below. First, a configuration of the permission management apparatus 13 will be explained. FIG. 2 is a diagram illustrating a functional configuration example of the permission management apparatus according to the first embodiment.

As illustrated in FIG. 2, the permission management apparatus 13 includes a communication interface (I/F) unit 20, a storage unit 21, and a control unit 22.

The communication I/F unit 20 is an interface, such as a network interface card (NIC). The communication I/F unit 20 transmits and receives various types of data to and from other devices via a network (not illustrated). For example, the communication I/F unit 20 transmits data of various screens, such as a login screen, a card registration screen, and an enabling instruction screen for designating a card for which use permission is to be enabled, to the user terminal 11, and receives various types of operating information on the screens from the user terminal 11. The communication I/F unit 20 also transmits a ticket for verifying the use permission of the card to the user terminal 11. The communication I/F unit 20 receives the ticket from the in-store device 12, and transmits information on whether the use permission of the card associated with the ticket is enabled or disabled to the in-store device 12 that has transmitted the ticket.

The storage unit 21 is a device for storing various types of information. For example, the storage unit 21 may be a semiconductor memory device, such as a random access memory (RAM) or a flash memory, or a storage device, such as a hard disk or an optical disk.

The storage unit 21 stores therein an operating system (OS) and various programs executed by the control unit 22. The storage unit 21 also stores therein various types of information. For example, the storage unit 21 stores therein a user information table 30, rights information 31, provided code information 32, and security policy information 33.

The user information table 30 is a table for storing information on a user who uses the system 10. For example, the user information table 30 stores therein a user ID (identification), a password, the name, and the address of the user. FIG. 3 is a diagram illustrating an example of a data structure of the user information table according to the first embodiment. In the user information table 30 illustrated in FIG. 3, fields for storing the user ID, the password, the name, and the address are provided, and information is stored in each of the fields for each user.

The rights information 31 is data in which information on a right to be managed is stored. Specifically, the rights information 31 stores therein information on a registered card as information on a right. For example, in the rights information 31, a user ID of a user who has registered the card and identification information on the card are stored in association with the use permission of the card. On the card, unique ID information, such as an identification number, a user's membership number, or a credit card number, is recorded for each of services to be provided. As the identification information on the card, the ID information recorded on the card is used for example. FIG. 4 is a diagram illustrating an example of a data structure of the rights information according to the first embodiment. In the rights information 31 illustrated in FIG. 4, a user ID, ID information, a type, and use permission information are stored. For example, in the example illustrated in FIG. 4, as for a user ID "0001", ID information "XXXXA" is registered and use permission "disabled" is indicated.

Figures 5, 6:
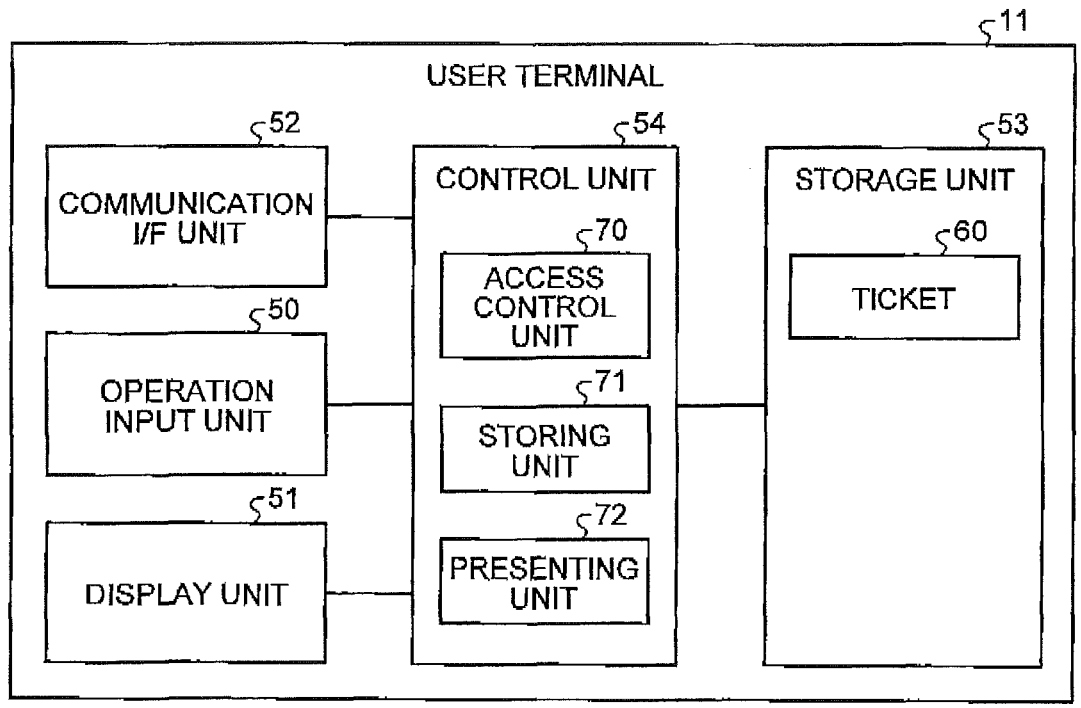
FIG. 5 is a diagram illustrating an example of a data structure of provided code information according to the first embodiment.
FIG. 6 is a diagram illustrating a functional configuration example of a user terminal according to the first embodiment.

The provided code information 32 is data in which information on a provided ticket is stored. For example, in the provided code information 32, the user ID of a user who has provided a ticket, ID information on the card for which the ticket has been provided, the provided ticket, and a provided date and time are stored in an associated manner. FIG. 5 is a diagram illustrating an example of a data structure of the provided code information according to the first embodiment. In the provided code information 32 illustrated in FIG. 5, fields for storing the user ID, the ID information, the ticket, the provided date and time are provided, and information is stored in each of the fields for each provided ticket.

The security policy information 33 is data in which a security policy on the use permission of a card is stored. In the first embodiment, when a user issues a use permission enabling instruction on a card, a validity period in which the use permission of the card is enabled is stored as the security policy information 33. For example, if "10 minutes" is set in the security policy information 33, a ticket is considered as valid within 10 minutes after the user has issued the request to enable the use permission of the card.

The control unit 22 is a device that controls the permission management apparatus 13. For example, the control unit 22 may be an electronic circuit, such as a central processing unit (CPU) or a micro processing unit (MPU), or an integrated circuit, such as an application specific integrated circuit (ASIC) or a field programmable gate array (FPGA).

The control unit 22 includes an internal memory for storing control data and programs that define various processing procedures, and performs various types of processing based on the data and the programs. The control unit 22 functions as various processing units when various programs are executed. For example, the control unit 22 includes an authenticating unit 40, a registration accepting unit 41, an instruction accepting unit 42, a generating unit 43, a providing unit 44, a registering unit 45, a changing unit 46, a verifying unit 47, and a notifying unit 48.

The authenticating unit 40 authenticates a user when access is requested by the user terminal 11. For example, when access is requested by the user terminal 11, the authenticating unit 40 transmits a web page of a login screen containing input fields of a user ID and a password to the user terminal 11, so that the login screen is displayed on the user terminal 11. If login is requested via the login screen, the authenticating unit 40 authenticates the user by checking whether a user ID and a password input in the input fields of the login screen match the user ID and the password of any of the users stored in the user information table 30. If the input user ID and the password do not match the user ID and the password of any of the users stored in the user information table 30, the authenticating unit 40 notifies the user terminal 11 of an authentication failure. In contrast, if the input user ID and the password match the user ID and the password of any of the users stored in the user information table 30, the authenticating unit 40 transmits, to the user terminal 11, a web page of a selection screen for selecting whether to register a card for which the use permission is to be managed or issue a use permission enabling instruction on the registered card, so that the selection screen is displayed on the user terminal 11.

The registration accepting unit 41 accepts registration of various cards with which rights are exercised in a store from the user authenticated by the authenticating unit 40. For example, when registration of the card is selected via the selection screen, the registration accepting unit 41 transmits, to the user terminal 11, a web page of a registration screen for registering information on a card for which the use permission is to be managed, so that the registration screen is displayed on the user terminal 11. In the registration screen, for example, input fields for inputting ID information on the card and a type of the card are provided so that the ID information and the type of the card can be input. When completion of the registration is designated via the registration screen, the registration accepting unit 41 registers data in the rights information 31 by associating the ID information and the type of the card input via the registration screen with the user ID of the authenticated user and by changing the use permission of the card to a disabled state.

The instruction accepting unit 42 accepts a use permission enabling instruction on the card with which a right is to be exercised from the user. For example, when a use permission enabling instruction on the card is selected via the selection screen, the instruction accepting unit 42 transmits, to the user terminal 11, a web page of an enabling instruction screen for issuing a use permission enabling instruction on a card that is stored in the rights information 31 in association with the user ID of the authenticated user, so that the enabling instruction screen is displayed on the user terminal 11. In the enabling instruction screen, for example, the ID information and the type of the card that are stored in the rights information 31 in association with the user ID of the authenticated user are displayed, and the use permission enabling instruction on each of the cards can be issued by selecting each of the cards.

The generating unit 43 generates a ticket associated with the card for which the use permission enabling instruction has been issued. For example, when the use permission enabling instruction on any of the cards is issued via the enabling instruction screen, the generating unit 43 generates a new ticket according to a predetermined code generation rule so that the ticket does not become the same as any ticket generated in the past. The ticket may be a numerical code, a character code, or a code in which numerals and characters are combined.

The providing unit 44 provides the ticket generated by the generating unit 43 to the user. For example, the providing unit 44 transmits ticket data to the user terminal 11 of the user in order to provide the ticket to the user. The way of providing the ticket is not limited to transmitting the ticket data. For example, the providing unit 44 may encode the ticket into a two-dimensional code, and may transmit image data of an image of the encoded two-dimensional code to the user terminal 11. Alternatively, the providing unit 44 may display numerals or characters of the ticket on the user terminal 11 to provide the ticket to the user.

The registering unit 45 registers, in the provided code information 32, the user ID of the user authenticated by the authenticating unit 40, the ID information on the card for which the use permission enabling instruction has been issued, and the provided date and time, in association with the ticket that is generated by the generating unit 43 and provided by the providing unit 44. Therefore, in the provided code information 32, the user ID of the user who has provided the ticket, the ID information on the card for which the ticket has been provided, the provided ticket, and the provided date and time are stored in an associated manner.

The changing unit 46 enables the use permission of the card for which the use permission enabling instruction has been accepted by the instruction accepting unit 42. For example, the changing unit 46 enables the use permission of the card, which is stored in the rights information 31 and for which the use permission enabling instruction has been accepted by the instruction accepting unit 42. Furthermore, the changing unit 46 periodically monitors the provided date and time of the ticket of each of the cards stored in the provided code information 32, and disables the use permission of the card if the validity period stored in the security policy information 33 has expired after the provided date and time.

When receiving the ticket from the in-store device 12, the verifying unit 47 verifies whether the received ticket is a proper ticket. For example, the verifying unit 47 determines whether the received ticket is stored in the provided code information 32. If the received ticket is not registered in the provided code information 32, the verifying unit 47 notifies the in-store device 12 that the ticket is not a proper ticket.

The notifying unit 48 sends a notice of whether the use permission of the card is enabled or disabled. For example, if the received ticket is stored in the provided code information 32, the notifying unit 48 obtains the ID information on the card associated with the received ticket from the provided code information 32, and specifies whether the use permission of the card is enabled or disabled based on the use permission of the card that is stored in the rights information 31 in association with the obtained ID information on the card. The notifying unit 48 notifies the in-store device 12 of data of the specified state of the use permission of the card.

A configuration of the user terminal 11 will be explained below. FIG. 6 is a diagram illustrating a functional configuration example of the user terminal according to the first embodiment.

As illustrated in FIG. 6, the user terminal 11 includes an operation input unit 50, a display unit 51, a communication I/F unit 52, a storage unit 53, and a control unit 54.

The operation input unit 50 is an input device for inputting various types of information. For example, the operation input unit 50 may be a mouse or a keyboard. The operation input unit 50 receives input of various operations from the user and inputs operating information indicating the contents of the received operations to the control unit 54.

The display unit 51 is a display device for displaying various types of information. For example, the display unit 51 may be a liquid crystal display (LCD) or a cathode ray tube (CRT). The display unit 51 displays various types of information. For example, the display unit 51 displays the login screen, the selection screen, the registration screen, and the enabling instruction screen.

The communication I/F unit 52 is an interface, such as a NIC. The communication I/F unit 52 transmits and receives various types of data to and from other devices via the network. For example, the communication I/F unit 52 receives data of various screens, such as the login screen, the selection screen, the registration screen, and the enabling instruction screen, from the permission management apparatus 13, and transmits various types of operating information on the screens to the permission management apparatus 13. The communication I/F unit 52 receives the ticket from the permission management apparatus 13.

The storage unit 53 is a device for storing various types of information. For example, the storage unit 53 may be a semiconductor memory device, such as a RAM or a flash memory, or a storage device, such as a hard disk or an optical disk.

The storage unit 53 stores therein an OS and various programs executed by the control unit 54. The storage unit 53 also stores therein various types of data. For example, the storage unit 53 stores therein a ticket 60.

The control unit 54 is a device that controls the user terminal 11. For example, the control unit 54 may be an electronic circuit, such as a CPU or an MPU, or an integrated circuit, such as an ASIC or an FPGA. The control unit 54 includes an internal memory for storing control data and programs that define various processing procedures, and performs various types of processing based on the data and the programs. The control unit 54 functions as various processing units when various programs are executed. For example, the control unit 54 includes an access control unit 70, a storing unit 71, and a presenting unit 72.

When predetermined operation to request access to the permission management apparatus 13 is performed on the operation input unit 50, the access control unit 70 issues an access request to the permission management apparatus 13. Accordingly, the permission management apparatus 13 transmits data of the login screen, and the login screen of the permission management apparatus 13 is displayed on the display unit 51. The user enters a user ID and a password in the login screen to perform login, and selects whether to register a card for which the use permission is to be managed or issue an instruction to enable the use permission of the registered card via the selection screen that is displayed after login. When registering a card for which the use permission is to be managed, the user registers information on the card for which the use permission is to be managed via the registration screen. Consequently, in the rights information 31, the user ID of the user who has registered the card, the ID information on the registered card, the type of the card, and the use permission information on the card are stored in an associated manner. In contrast, when issuing the use permission enabling instruction on the card, the user selects ID information on the card for which the use permission of the card is to be enabled via the enabling instruction screen. Therefore, ticket data is received from the permission management apparatus 13.

When receiving the ticket from the permission management apparatus 13, the storing unit 71 stores the ticket in the storage unit 53. Therefore, the ticket 60 is stored in the storage unit 53.

When predetermined operation to request presentation of the ticket is performed on the operation input unit 50, the presenting unit 72 presents the ticket 60 stored in the storage unit 53. For example, the presenting unit 72 enables the ticket 60 stored in the storage unit 53 to be read by wireless near field communication, such as near field communication (NFC) or radio frequency identification (RFID). The way of presenting the ticket 60 is not limited to enabling the ticket 60 to be read by radio. For example, if the ticket 60 is image data of a two-dimensional code or the like, the presenting unit 72 may display an image of the image data on the display unit 51. Furthermore, the presenting unit 72 may convert the ticket 60 to image data of a two-dimensional code or the like, and may display an image of the converted ticket on the display unit 51. Moreover, the presenting unit 72 may display numerals or characters of the ticket 60 on the display unit 51.

Figure 7:
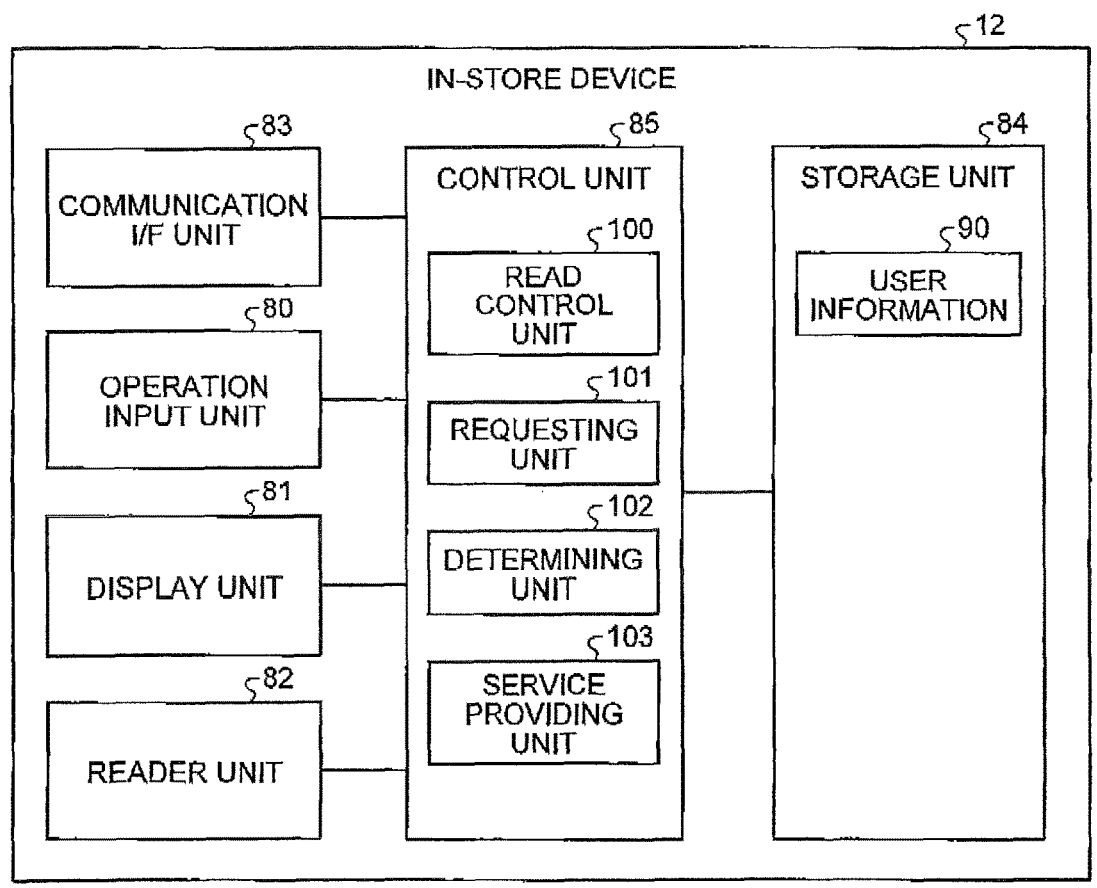
FIG. 7 is a diagram illustrating a functional configuration example of an in-store device according to the first embodiment.

A configuration of the in-store device 12 will be explained below. FIG. 7 is a diagram illustrating a functional configuration example of the in-store device according to the first embodiment.

As illustrated in FIG. 7, the in-store device 12 includes an operation input unit 80, a display unit 81, a reader unit 82, a communication I/F unit 83, a storage unit 84, and a control unit 85.

The operation input unit 80 is an input device for inputting various types of information. For example, the operation input unit 80 may be a mouse, a keyboard, or a touch panel. The operation input unit 80 receives input of various types of information from a store staff and inputs operating information indicating the contents of the received operations to the control unit 85.

The display unit 81 is a display device for displaying various types of information. For example, the display unit 81 may be an LCD or a CRT. The display unit 81 displays various types of information. For example, the display unit 81 displays whether to permit use of a card.

The reader unit 82 reads the ticket and outputs the read ticket to the control unit 85. The reader unit 82 may read the ticket by wireless near field communication. Alternatively, the reader unit 82 may read an image of a two-dimensional code in which the ticket is encoded, and may decode the read image to output the encoded ticket to the control unit 85.

The communication I/F unit 83 is an interface, such as a NIC. The communication I/F unit 83 transmits and receives various types of data to and from other devices via the network. For example, the communication I/F unit 83 transmits the ticket to the permission management apparatus 13 and receives personal information from the permission management apparatus 13.

The storage unit 84 is a device for storing various types of information. For example, the storage unit 84 may be a semiconductor memory device, such as a RAM or a flash memory, or a storage device, such as a hard disk or an optical disk.

The storage unit 84 stores therein an OS and various programs executed by the control unit 85. The storage unit 84 also stores therein various types of data. For example, the storage unit 84 stores therein user information 90.

The user information 90 is data containing information on a user who is a customer of each of stores. For example, in a store that provides a point card, information on a user who has generated the point card, the ID information on the card such as a card number of the point card, or accumulated points are stored as the user information 90. The user information 90 may be stored in a server computer of a center that manages the in-store device 12 installed in each of the stores.

The control unit 85 is a device that controls the in-store device 12. For example, the control unit 85 may be an electronic circuit, such as a CPU or an MPU, or an integrated circuit, such as an ASIC or an FPGA. The control unit 85 includes an internal memory for storing control data and programs that define various processing procedures, and performs various types of processing based on the data and the programs. The control unit 85 functions as various processing units when various programs are executed. For example, the control unit 85 includes a read control unit 100, a requesting unit 101, a determining unit 102, and a service providing unit 103.

When predetermined operation to request start of reading the ticket is performed on the operation input unit 80, the read control unit 100 reads the ticket by controlling the reader unit 82. Incidentally, when operation is performed to provide a service using a card, the read control unit 100 may start reading the ticket in conjunction with the operation. For example, if the in-store device 12 is a POS terminal and operation to designate payment by a credit card is performed, the read control unit 100 may display a message for requesting presentation of the ticket and start reading the ticket in conjunction with the operation.

The requesting unit 101 transmits the ticket that the reader unit 82 has read under the control of the read control unit 100 to the permission management apparatus 13, to thereby request verification of the permission.

If the use of the card presented by the user is permitted, the service providing unit 103 provides a service according to the card. For example, if the ID information on the card presented by the user is stored in the user information 90 and when receiving a notice indicating that the use permission of the card is enabled from the permission management apparatus 13, the service providing unit 103 provides the service according to the card. For example, if a user presents a point card and requests use of accumulated points, the service providing unit 103 performs transaction processing by discounting the price of a product by the amount corresponding to the accumulated points.

1-3. Flow for Verifying Use Permission

Figure 8:
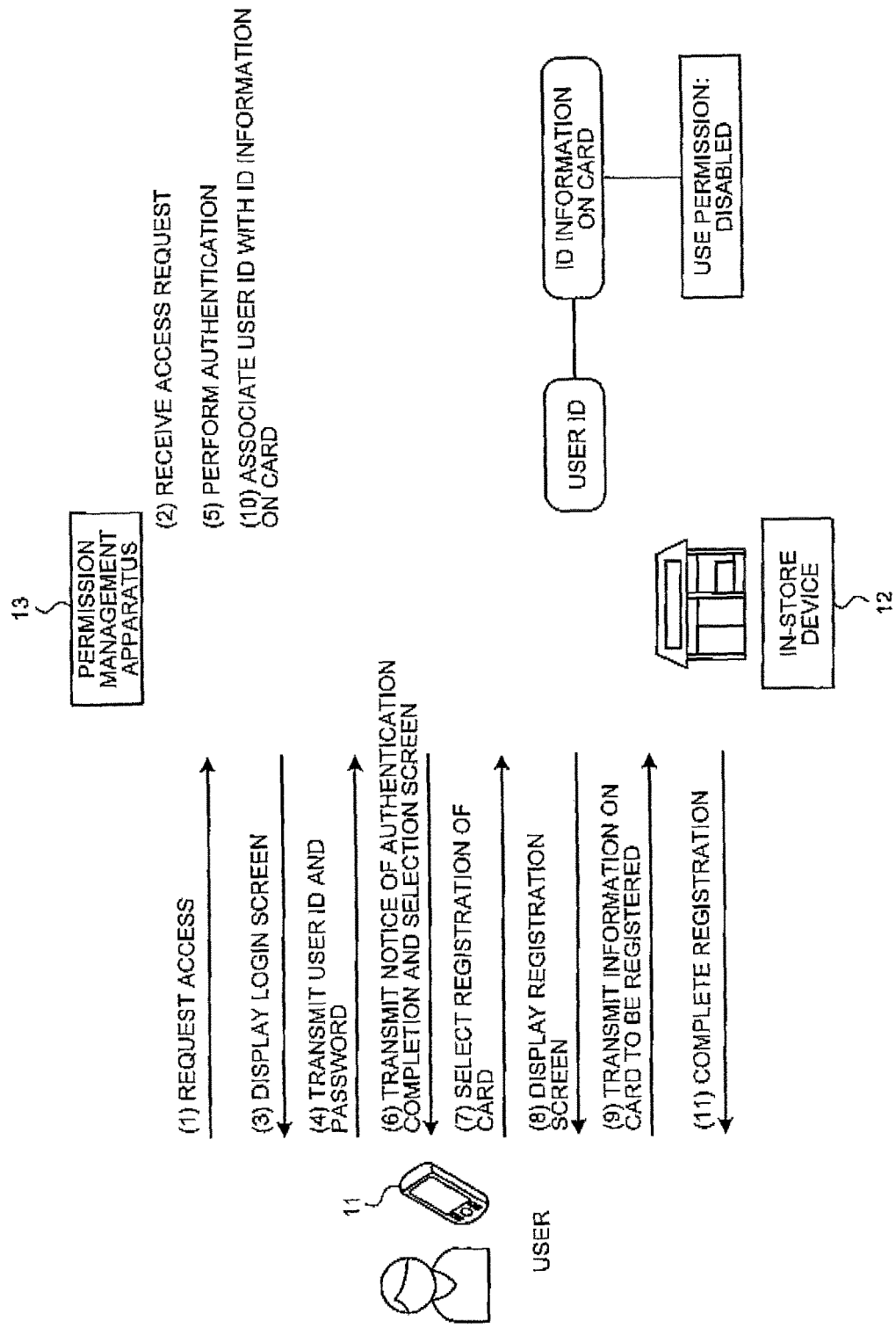
FIG. 8 is a sequence diagram illustrating the flow for registering a card for which use permission is to be managed.

The flow for verifying the use permission of a card by the system 10 according to the first embodiment will be explained below with reference to FIG. 8 and FIG. 10. FIG. 8 is a sequence diagram illustrating the flow for registering a card for which the use permission is to be managed.

(1) When predetermined operation is performed on the operation input unit 50 to request access to the permission management apparatus 13, the user terminal 11 issues an access request to the permission management apparatus 13.

(2) The permission management apparatus 13 receives the access request from the user terminal 11.

(3) When receiving the access request, the permission management apparatus 13 transmits a web page of the login screen to the user terminal 11, so that the login screen is displayed on the user terminal 11. Accordingly, the user enters a user ID and a password in the login screen by operating the operation input unit 50 and performs operation to request login.

(4) When the operation to request login is performed on the login screen, the user terminal 11 transmits the user ID and the password entered in the login screen to the permission management apparatus 13.

(5) The permission management apparatus 13 authenticates the user by the user ID and the password received from the user terminal 11.

(6) When successfully authenticating the user by the user ID and the password, the permission management apparatus 13 transmits a notice that the authentication has successfully completed, and also transmits a web page of the selection screen to the user terminal 11 to select whether to register a card for which the use permission is to be managed or issue a use permission enabling instruction on the registered card, so that the selection screen is displayed on the user terminal 11.

(7) When registering the card for which the use permission is to be managed, the user selects a card from the selection screen by operating the operation input unit 50. Therefore, the user terminal 11 transmits a notice of selection of the registration of the card to the permission management apparatus 13.

(8) If the registration of the card is selected via the selection screen, the permission management apparatus 13 transmits a web page of the registration screen to the user terminal 11, so that the registration screen is displayed on the user terminal 11. The user inputs information on the card, such as the ID information or the type of the card, for which the use permission is to be managed via the registration screen.

(9) If the information on the card is input via the registration screen, the user terminal 11 transmits the input information on the card to the permission management apparatus 13.

(10) The permission management apparatus 13 registers data in the rights information 31 by associating the ID information on the card input via the registration screen with the user ID of the authenticated user and setting the use permission of the card to a disabled state. Therefore, the user ID, the ID information on the card, and the use permission of the card are stored in the rights information 31 in an associated manner.

(11) If the registration of the data in the rights information 31 is completed, the permission management apparatus 13 notifies the user terminal 11 of the completion of the registration.

In the first embodiment, the validity period of the card is stored in the security policy information 33 in advance. However, it may be possible to allow a user to set the validity period via the user terminal 11.

Figure 9:
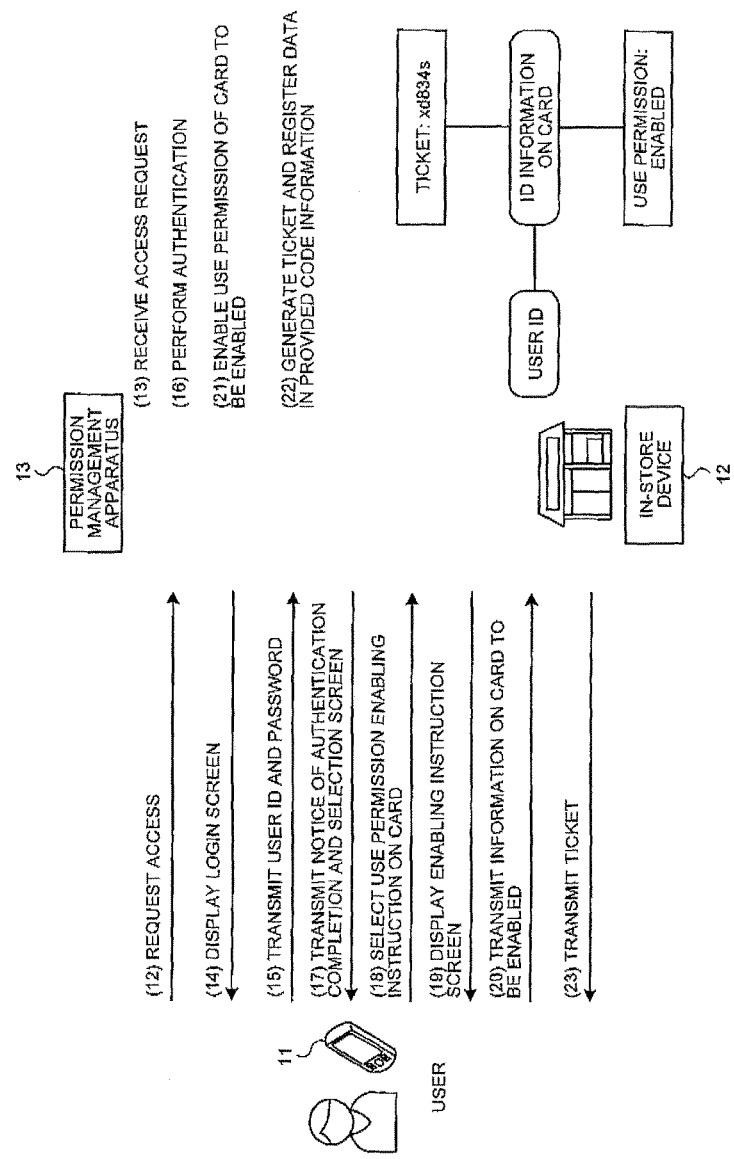
FIG. 9 is a sequence diagram illustrating the flow for issuing a ticket for verifying the use permission of the card.

FIG. 9 is a sequence diagram illustrating the flow for issuing the ticket for verifying the use permission of the card. The processes from (12) to (17) are the same as the processes from (1) to (6); therefore, explanation thereof will be omitted.

(18) When issuing the use permission enabling instruction on the registered card, the user selects the use permission enabling instruction on the card via the selection screen by operating the operation input unit 50. Therefore, the user terminal 11 notifies the permission management apparatus 13 that the use permission enabling instruction on the card is selected.

(19) If the use permission enabling instruction on the card is selected via the selection screen, the permission management apparatus 13 transmits a web page of the enabling instruction screen to the user terminal 11, so that the enabling instruction screen is displayed on the user terminal 11. The user selects ID information on a card for which the use permission is enabled, via the enabling instruction screen.

(20) If the use permission enabling instruction on any of the cards is selected via the enabling instruction screen, the user terminal 11 transmits, to the permission management apparatus 13, information on the card, such as the ID information on the card for which the use permission enabling instruction has been issued.

(21) The permission management apparatus 13 enables the use permission of the card for which the use permission enabling instruction has been issued.

(22) The permission management apparatus 13 generates a ticket associated with the card for which the use permission enabling instruction has been issued, and registers the user ID of the authenticated user, the ID information on the card for which the use permission enabling instruction has been issued, and the provided date and time in the provided code information 32 in association with the generated ticket. Therefore, the ticket, the user ID, the ID information on the card, and the use permission of the card are associated with one another.
(23) The permission management apparatus 13 transmits the generated ticket to the user terminal 11. When receiving the ticket from the permission management apparatus 13, the user terminal 11 stores the ticket in the storage unit 53.

Figure 10:
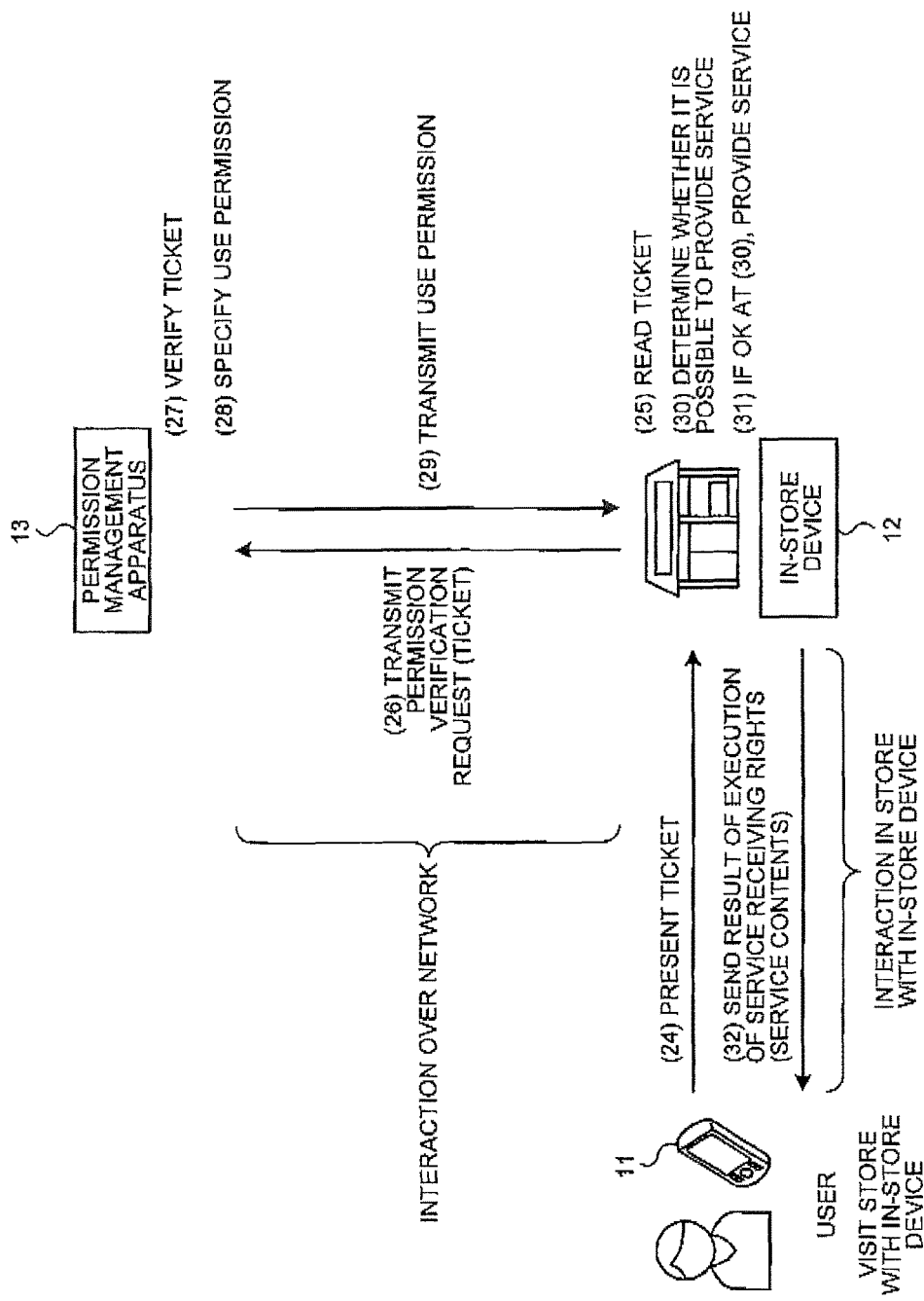
FIG. 10 is a sequence diagram illustrating the flow for verifying the use permission of the card.

FIG. 10 is a sequence diagram illustrating the flow for verifying the use permission of the card.
(24) When exercising a right with a card in a store, a user performs predetermined operation on the operation input unit 50 to request presentation of a ticket. Therefore, the user terminal 11 enables the ticket 60 stored in the storage unit 53 to be read by wireless near field communication and presents the ticket.
(25) When a store staff performs predetermined operation on the operation input unit 80 to request start of reading the ticket, the in-store device 12 causes the reader unit 82 to read the ticket.
(26) The in-store device 12 transmits the read ticket to the permission management apparatus 13 to request verification of the permission.
(27) When receiving the ticket from the in-store device 12, the permission management apparatus 13 verifies whether the received ticket is a proper ticket.
(28) If the received ticket is a proper ticket, the permission management apparatus 13 obtains the ID information on the card associated with the received ticket from the provided code information 32, and specifies whether the use permission of the card is enabled or disabled based on the use permission of the card that is stored in the rights information 31 in association with the obtained ID information on the card.
(29) The permission management apparatus 13 transmits the specified state of the use permission of the card to the in-store device 12 that has transmitted the ticket.
(30) The in-store device 12 determines whether it is possible to provide a service. For example, the in-store device 12 determines whether the ID information on the card presented by the user is stored in the user information 90 and whether the use permission of the card specified by the permission management apparatus 13 is enabled.
(31) If it is possible to provide the service, the in-store device 12 provides the service according to the card.
(32) If it is necessary to issue a service provision result, the in-store device 12 notifies the user terminal 11 of the service provision result.

Incidentally, the permission management apparatus 13 may store, as the user information, characteristic information indicating the characteristics of the user, and may transmit the characteristic information to the in-store device 12 together with the notice of whether the use permission of the card is enabled or disabled. The characteristic information may be any information that enables to identify the user. For example, image data of a face of the user or physical characteristic information, such as a height, sex, a fingerprint, a voiceprint, or a position of a mole, may be used. For example, the permission management apparatus 13 stores the image data of the face of the user in the storage unit 21 in association with the user ID of the user. The notifying unit 48 specifies the user ID associated with the received ticket from the provided code information 32, and transmits the image data associated with the specified user ID, as the user information, to the in-store device 12. The in-store device 12 displays an image of the transmitted image data. Therefore, a store staff can identify the user by comparing the face in the image with the actual face of the user who has requested the service. The method to identify the user is not limited to the method performed by a person, such as a store staff. For example, it may be possible to mount a camera on the in-store device 12 to capture the face of the user, and perform matching or the like by comparing the captured face with a face of the received image data to identify the user. Furthermore, if the characteristic information is a voiceprint, it may be possible to record voice of the user by a microphone and determine whether the voiceprints match with each other to identify the user. Moreover, if the characteristic information is a fingerprint, it may be possible to acquire the fingerprint of the user by a fingerprint reader and determine whether the fingerprints match with each other to identify the user. Namely, the in-store device 12 may acquire the physical characteristics of the user to identify the user.

As described above, the permission management apparatus 13 accepts registration of various cards of a user and manages the use permission of the cards. Namely, the permission management apparatus 13 centrally manages the use permission of various registered cards that are issued by different providers. Therefore, by registering various cards issued by different providers in the permission management apparatus 13, the user can centrally manage the use permission of various cards by only the permission management apparatus 13, so that the convenience for the user can be improved. When the use permission enabling instruction on a card is issued, the permission management apparatus 13 provides the user with a ticket associated with the card for which the use permission enabling instruction has been issued, and enables the use permission of the card for a predetermined period. Then, when receiving the ticket from the in-store device 12, the permission management apparatus 13 notifies the in-store device 12 of the use permission of the card. Therefore, the permission management apparatus 13 can prevent unauthorized use of the card even when the card is lost. Furthermore, the permission management apparatus 13 accepts registration of various cards of a user and centrally manage the use permission of the cards. Therefore, with the permission management apparatus 13, a user need not access different systems to release locks for different cards and need not learn rules to release the locks for the respective cards. As a result, the convenience for the user can be improved. Moreover, the in-store device 12 can verify the use permission of various cards via the permission management apparatus 13. Therefore, it becomes possible to reduce load of the system construction in the store.

1-4. Operation

Figure 11:
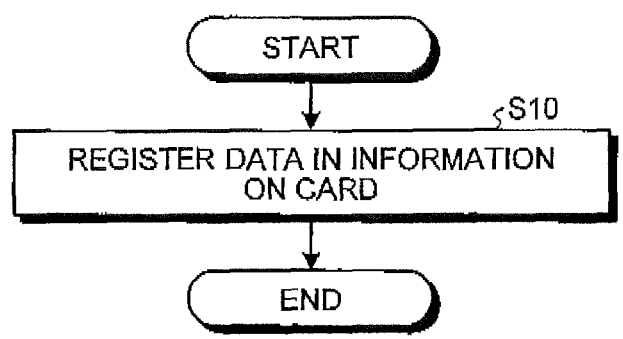
FIG. 11 is a flowchart illustrating the flow of a registration process.

Operation of the system 10 according to the first embodiment will be explained below. First, explanation will be given of the flow of a registration process for registering, in the rights information 31, information on the card for which the use permission is to be managed by the permission management apparatus 13 according to the first embodiment. FIG. 11 is a flowchart illustrating the flow of the registration process. The registration process is performed at a predetermined timing, for example, a timing at which the operation to designate the completion of the registration is performed on the registration screen and the information on the card, such as the ID information on the card, input via the registration screen is received from the user terminal 11.

As illustrated in FIG. 11, the registration accepting unit 41 registers data in the rights information 31 by associating the ID information on the card input via the registration screen with the user ID of the authenticated user and by changing the use permission of the card to a disabled state (910), and the process ends.

Figure 12:
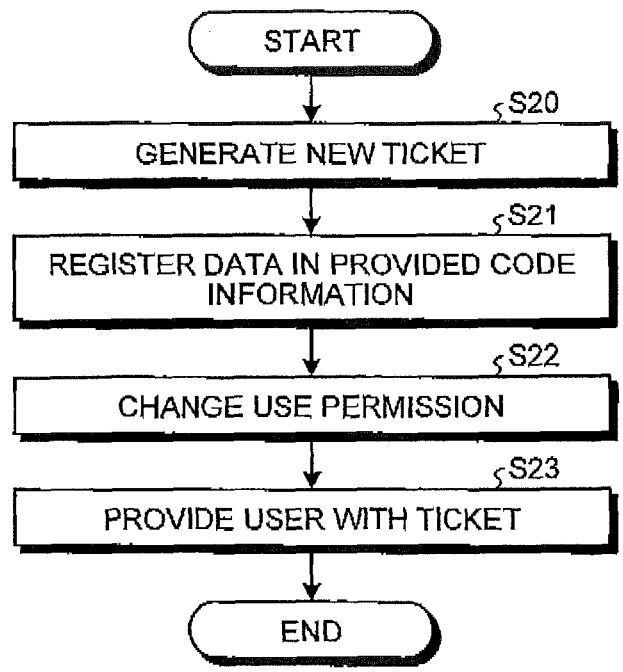
FIG. 12 is a flowchart illustrating the flow of a ticket providing process.

Next, explanation will be given of the flow of a ticket providing process for providing a ticket to a user by the permission management apparatus 13 according to the first embodiment. FIG. 12 is a flowchart illustrating the flow of the ticket providing process. The ticket providing process is performed at a predetermined timing, for example, a timing at which the operation to issue a use permission enabling instruction on any of the cards is performed on the enabling instruction screen and information on the card for which the use permission enabling instruction has been issued via the enabling instruction screen is received from the user terminal 11.

As illustrated in FIG. 12, the generating unit 43 generates a new ticket (S20). The registering unit 45 registers the user ID of the authenticated user, the ID information on the card for which the use permission enabling instruction has been issued, and the provided date and time in the provided code information 32 in association with the ticket generated by the generating unit 43 (S21). The changing unit 46 enables the use permission of the card, for which the use permission enabling instruction has been issued and which is stored in the rights information 31 (S23). The providing unit 44 provides the generated ticket to the user (S22), and the process ends.

Figure 13:
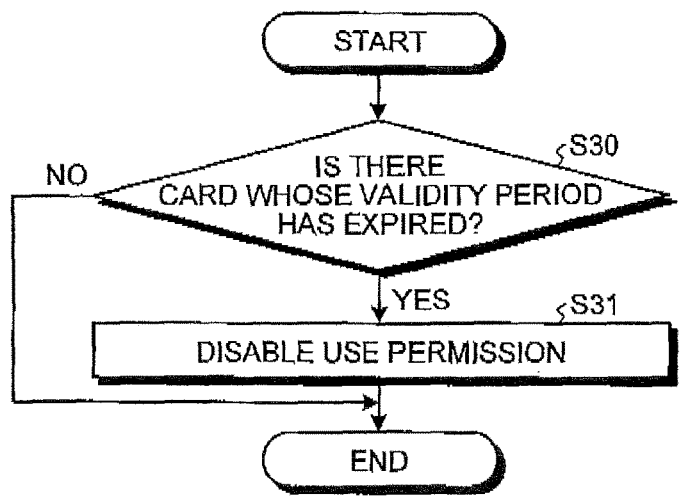
FIG. 13 is a flowchart illustrating the flow of a permission changing process.

The flow of a permission changing process for changing the use permission of the card by the permission management apparatus 13 according to the first embodiment will be explained below. FIG. 13 is a flowchart illustrating the flow of the permission changing process. The permission changing process is performed periodically, for example, with a predetermined cycle.

As illustrated in FIG. 13, the changing unit 46 monitors the provided date and time of the ticket of each of the cards stored in the provided code information 32, and determines whether there is a card whose validity period stored in the security policy information 33 has expired based on the provided date and time (S30). If there is no card whose validity period has expired (NO at S30), the process ends. In contrast, if there is a card whose validity period has expired (YES at S30), the changing unit 46 disables the use permission of the card whose validity period has expired in the rights information 31 (S31), and the process ends.

Figure 14:
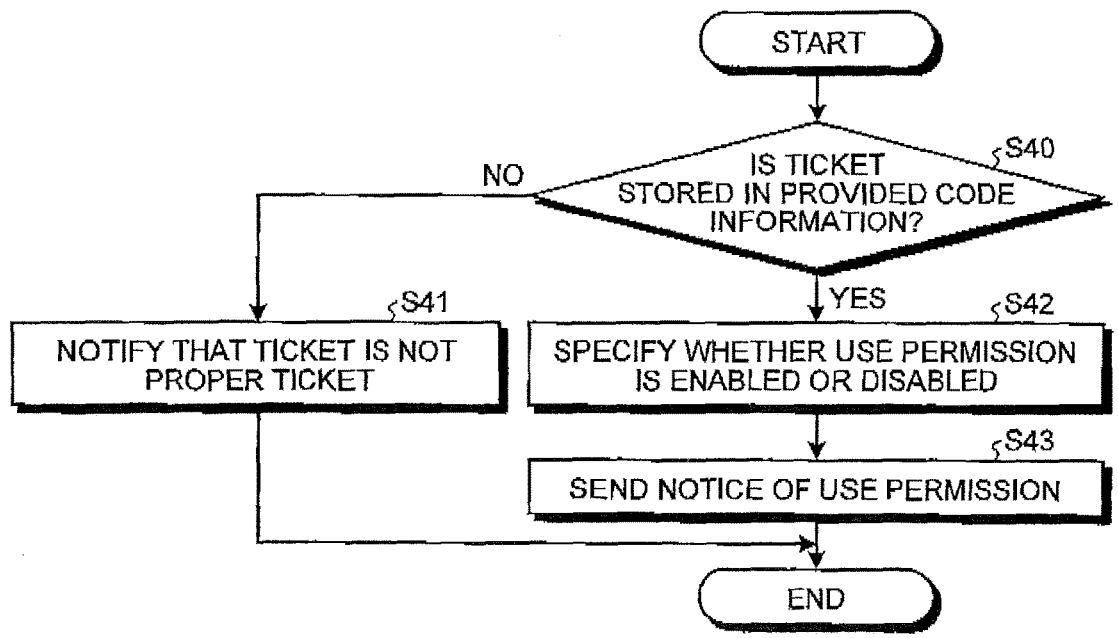
FIG. 14 is a flowchart illustrating the flow of a notification process.

The flow of a notification process for notifying whether the use permission of the card is enabled or disabled by the permission management apparatus 13 according to the first embodiment will be explained below. FIG. 14 is a flowchart illustrating the flow of the notification process. The notification process is performed at a predetermined timing, for example, a timing at which the ticket is received.

As illustrated in FIG. 14, the verifying unit 47 determines whether the received ticket is stored in the provided code information 32 (S40). If the ticket is not stored in the provided code information 32 (NO at S40), the verifying unit 47 notifies the in-store device 12 that the ticket is not a proper ticket (S41), and the process ends. In contrast, if the ticket is stored in the provided code information 32 (YES at S40), the notifying unit 48 obtains the ID information on the card associated with the received ticket from the provided code information 32, and specifies whether the use permission of the card is enabled or disabled based on the use permission of the card that is stored in the rights information 31 in association with the obtained ID information on the card (S42). The notifying unit 48 notifies the in-store device 12 of data of the specified state of the use permission of the card (S43), and the process ends.

1-5. Advantageous Effects

As described above, the permission management apparatus 13 accepts registration of various cards as the rights information on a right to use a service provided by a service provider in a store, and stores, in the storage unit 21, use permission information indicating a disabled state of the use permission of the registered card. The permission management apparatus 13 accepts a use permission enabling instruction on the card with which the right is to be exercised from the user who is to exercise the right with the card in the store, and provides the user with the code information associated with the card for which the use permission enabling instruction has been issued. Furthermore, the permission management apparatus 13 enables the use permission of the card, for which the use permission enabling instruction on the card has been issued and which is stored in the use permission information, for a predetermined period. When receiving the code information from the in-store device 12 installed in the store, the permission management apparatus 13 notifies the in-store device 12 whether the use permission of the card is enabled or disabled based on the use permission of the card that is stored in the use permission information in association with the code information. Therefore, the permission management apparatus 13 can prevent unauthorized use of the right and improve the convenience for the user.

Furthermore, the validity period of the ticket is determined, and if the ticket received from the in-store device 12 has not expired, the permission management apparatus 13 notifies the in-store device 12 that the use permission of the card is enabled. Therefore, by appropriately determining the validity period, the permission management apparatus 13 can prevent unauthorized use of the ticket even when the ticket is leaked.

Second Embodiment 2-1. System Configuration

A second embodiment will be explained below. The configurations of the system 10, the user terminal 11, the in-store device 12, and the permission management apparatus 13 according to the second embodiment are approximately the same as those of the first embodiment; therefore, different components will be mainly explained below.

The permission management apparatus 13 stores, as the security policy information 33, a condition to enable the use permission (use permission enabling condition) for each type of the cards. For example, the validity period in which the use permission of a card is enabled is stored for each type of the cards.

The changing unit 46 periodically monitors the provided date and time of a ticket of each of the cards stored in the provided code information 32, and disables the use permission of the card for which the validity period of each type of the cards stored in the security policy information 33 has expired after the provided date and time.

Therefore, the permission management apparatus 13 can set the validity period of the ticket for each type of the cards, and therefore can change the security for each type of the cards. For example, it may be possible to prevent unauthorized use of a card by setting a short validity period for a card that will be more damaged when the card is lost and misused or a card that is often misused. In contrast, if a card is rarely misused, it is possible to set a long validity period for the card and allow the user to use the card for a longer time after the user has acquired the ticket. Consequently, it becomes possible to improve the convenience for the user. Incidentally, it may be possible to allow each user to individually set the use permission enabling condition for each type of the cards. Alternatively, it may be possible to allow an administrator of the permission management apparatus 13 to set the condition.

Furthermore, for a user who has issued the use permission enabling instruction via the instruction accepting unit 42, if a card other than a card for which the use permission enabling instruction has been issued is enabled in the rights information 31, the changing unit 46 disables the card for which the use permission enabling instruction has been issued. Namely, if any of the cards is already enabled, the changing unit 46 disables the card for which the use permission enabling instruction has been issued, instead of enabling the card, so as to prevent a plurality of cards from being enabled simultaneously.

Moreover, for a user who has issued the use permission enabling instruction via the instruction accepting unit 42, if a card other than a card for which the use permission enabling instruction has been issued is enabled, the providing unit 44 cancels provision of the code information on the card for which the use permission enabling instruction has been issued.

Therefore, the permission management apparatus 13 prevents the user from simultaneously enabling a plurality of the cards. Consequently, it becomes possible to prevent unauthorized use even when a ticket of each of the cards is leaked.

Figure 15:
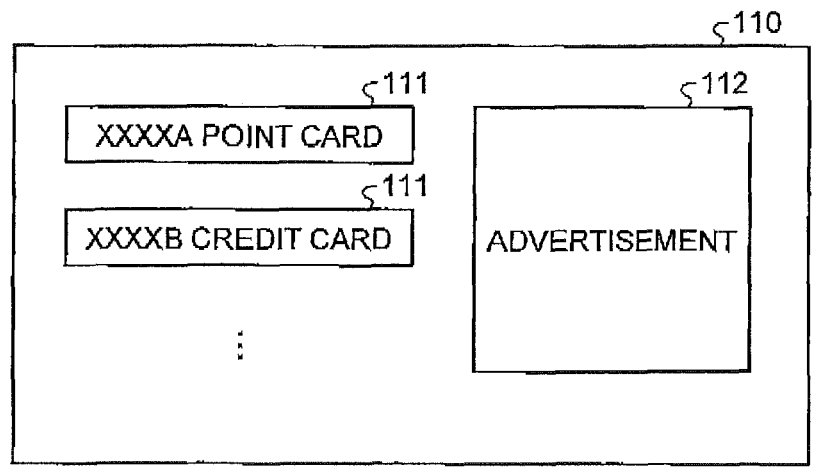
FIG. 15 is a diagram illustrating an example of an enabling instruction screen.

Furthermore, an advertisement may be displayed on the enabling instruction screen according to the second embodiment. FIG. 15 is a diagram illustrating an example of the enabling instruction screen. An enabling instruction screen 110 displays the ID information and the type of the card on buttons 111 arranged on the screen, and a card to be enabled is selectable by the buttons 111. Moreover, an advertisement 112 may be displayed on the enabling instruction screen 110. When a card to be enabled is designated via the enabling instruction screen 110, the instruction accepting unit 42 displays the advertisement 112 related to a service offered by the designated card on the enabling instruction screen 110 for presentation to the user. For example, the instruction accepting unit 42 displays, as the advertisement 112, a neighborhood store that provides a service of the designated card on the enabling instruction screen 110. Furthermore, the permission management apparatus 13 can recognize the usage of the card by accumulating, in the storage unit 21, history information on the card enabled by each of the users. Therefore, the permission management apparatus 13 displays, for example, an advertisement related to a service of a frequently-used card on the enabling instruction screen 110. For example, the permission management apparatus 13 displays, on the enabling instruction screen 110, an advertisement related to a store that provides a service of a frequently-used point card or an advertisement related to a product with which the point card can earn higher points. The advertisement displayed on the enabling instruction screen 110 may be acquired by sending a query to other server device that stores therein advertisements to be provided for each of the services offered by the cards. Alternatively, the permission management apparatus 13 may store, as advertisement information, advertisements related to the respective services in the storage unit 21, and may acquire an advertisement to be displayed from the advertisement information. The layout of the enabling instruction screen 110 illustrated in FIG. 15 is one example, and the present invention is not limited thereto.

2-2. Advantageous Effects

As described above, the permission management apparatus 13 further stores, in the storage unit 21, the use permission enabling condition for each type of the cards. The permission management apparatus 13 changes the use permission of the card for which the use permission enabling instruction has been issued, according to the condition corresponding to the type of the cards stored in the storage unit 21. Therefore, the permission management apparatus 13 can set the condition for each type of the cards, and therefore can change the use permission of the card for each type of the cards.

Furthermore, the permission management apparatus 13 further presents, to the user, an advertisement related to the card for which the use permission enabling instruction has been issued. Therefore, the permission management apparatus 13 can provide an advertisement corresponding to the service used by the user by presenting the advertisement related to the card for which the use permission enabling instruction has been issued. Consequently, it is possible to improve the advertisement effectiveness.

Moreover, for a user who has issued the use permission enabling instruction on the card, if a card other than the card for which the use permission enabling instruction has been issued is enabled, the permission management apparatus 13 disables the card for which the use permission enabling instruction has been issued, and cancels provision of the code information. Therefore, the permission management apparatus 13 can prevent unauthorized use even when the ticket of each of the cards is leaked.

3. Others

While the embodiments of the present invention have been explained in detail above with reference to the accompanying drawings, the embodiments are described by way of example only. Various modifications and changes of the invention including the aspects described in the Detailed Description of the Embodiments can be made based on the knowledge of one skilled in the art.

For example, while an example is explained in the above embodiments that a store serves as a facility, and the right according to a card is exercised as the right granted by a service provider, the present invention is not limited to this example. For example, the present invention may be applied when a service is provided to a specific individual in public institutions, for example, when the individual acquires the extract of family register in administrative institution or views information on property register in Legal Affairs Bureau. Furthermore, the present invention may be applied in order to verify rights, for example, to verify whether a user is a member or whether a user is allowed to buy a product at a sales price in a store. Namely, the rights to be managed by the permission management apparatus 13 are not limited to the rights provided by a card.

Moreover, while an example is explained in the above embodiments that the permission management apparatus 13 provides a user with a ticket for verifying the permission to use the right with the card in the store, the present invention is not limited to this example. For example, if entering and leaving is managed by using a card, the permission management apparatus 13 may provide a user with code information in order to verify whether the user is permitted to enter and leave a place by using the card, and an entering/leaving management system may allow the user to enter and leave the place if the user has the card for which the permission is confirmed by the code information. Consequently, it becomes possible to prevent an unauthorized person impersonating the user from entering and leaving the place.

Furthermore, the right managed by the permission management apparatus 13 is not limited to the right to use one service. Namely, the right managed by the permission management apparatus 13 may be a right to use a plurality of services. If the right to use a plurality of the services is collectively registered in the permission management apparatus 13, it becomes not necessary to separately manage the rights for the respective services. Therefore, it becomes possible to integrally manage the rights by the permission management apparatus 13. Consequently, the convenience for the user can be improved. Besides, the in-store device 12 need not verify the permission by different systems for the respective services, but can verify the permission of all of the services by the permission management apparatus 13. Therefore, it becomes possible to reduce load of the system construction in the store.

Moreover, while an example is explained in the above embodiments that the in-store device 12 transmits the ticket to the permission management apparatus 13 and the permission management apparatus 13 determines whether the received ticket is stored in the provided code information 32, the present invention is not limited to this example. For example, the in-store device 12 may transmit at least one of the ID information on the card and the user ID of the user to the permission management apparatus 13 together with the ticket, and the permission management apparatus 13 may determine whether the ID information or the user ID is stored in the provided code information 32 in association with the received ticket. With this configuration, the permission management apparatus 13 can verify whether the ticket has been issued for the card and whether the user who has presented the ticket is a valid user of the card.

Furthermore, while an example is explained in the above embodiments that the security policy information 33 stores therein the validity period of the ticket as the use permission enabling condition for the card, the present invention is not limited to this example. For example, it may be possible to store, as the security policy, address information, such as the IP address, of the in-store device 12, and enables the ticket when the ticket is received from the address designated by the address information. For another example, as the security policy, it may be possible to enable the use permission of the card when the permission management apparatus 13 can successfully complete the authentication of the user who has requested the ticket within a predetermined period, such as 5 minutes, after reception of the ticket from the in-store device 12. Therefore, it becomes possible to prevent unauthorized use even when the ticket is leaked, so that the security of the ticket can be improved.

Figure 16:
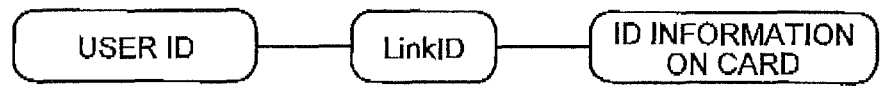
FIG. 16 is a diagram for explaining an intermediate number.

Moreover, while an example is explained in the above embodiments that the user ID of the user and the ID information unique to the card are stored in the rights information 31 and the provided code information 32 in an associated manner, the present invention is not limited to this example. For example, it may be possible to store, as the ID information on the card, an intermediate number that is determined in association with a number uniquely assigned to the card. FIG. 16 is a diagram for explaining the intermediate number. For example, as illustrated in FIG. 16, an intermediate number (Link ID) is determined in association with a number (SID) uniquely assigned to a card. In the rights information 31 and the provided code information 32, the user ID of the user and the Link ID are stored in association with each other. Accordingly, the user ID and the SID are associated with each other via the Link ID. As described above, by storing the Link ID instead of the number uniquely assigned to the card, even when, for example, the rights information 31 and the provided code information 32 stored in the storage unit 21 are leaked and the Link ID is accordingly leaked, it is possible to prevent leakage of the number unique to the card.

The permission management apparatus 13 as described above may be implemented by a plurality of server computers. Furthermore, the structure of the permission management apparatus 13 may be changed flexibly depending on the functions. For example, the functions may be implemented by calling an external platform by an application programming interface (API) or a network computing.

Furthermore, "a unit" recited in the claims may be replaced with "a section, a module, or a means" or "a circuit". For example, the searching unit may be replaced with a searching means or a search circuit.

According to an embodiment of the present invention, the permission management apparatus can prevent unauthorized use of the rights and improve the convenience for the use.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A permission management apparatus comprising:
   a memory storing: (i) registration information of each of a plurality of service cards in association with identification information, and (ii) permission information including a plurality of enablement state indicators corresponding one-to-one to the plurality of service cards, each of the plurality of enablement state indicators indicating whether the corresponding one of the plurality of service cards is enabled or disabled; and
   a processor, the memory including processor-executable instructions which when executed by the processor cause the processor to perform the steps of:
   receiving, from a user terminal, a use permission request requesting a first enablement state indicator be set to an enabled state, the first enablement state indicator: (i) being one of the plurality of enablement state indicators, and (ii) corresponding to a first service card associated with first identification information, the first service card being one of the plurality of services cards;
   determining an enablement state of each of the plurality of enablement indicators;
   responsive to determining that any one of the plurality of enablement state indicators other than the first enablement state indicator is set to the enabled state, maintaining the first enablement state indicator of the first service card in a disabled state, and responsive to determining that none of the plurality of enablement state indicators is enabled, changing the first enablement state indicator of the first service card from the disabled state to the enabled state for a predetermined period of time;

generating and transmitting a ticket to the user terminal, and storing the generated ticket in the memory in association with the first identification information, in response to the first enablement state indicator of the first service card being changed from the disabled state to the enabled state; and in response to receiving the ticket from an in-store device, verifying the ticket and transmitting, to the in-store device, first permission information of the first service card based on the changed enablement state indicator of the first service card associated with the first identification information, the first permission information indicating that the first enablement state indicator of the first service card is enabled.

2. The permission management apparatus according to claim 1, wherein:

the memory stores a condition controlling the enablement state indicator of each of the plurality of service cards; and the instructions which when executed by the processor cause the processor to perform the step of changing the enablement state indicator of each of the plurality of service cards based on the stored condition being satisfied.

3. The permission management apparatus according to claim 1, wherein the instructions which when executed by the processor cause the processor to perform the step of transmitting an advertisement to the user terminal receiving the ticket.

4. The permission management apparatus according to claim 1, wherein:

the memory stores characteristic information including characteristics of a user of the user terminal; and the instructions which when executed by the processor cause the processor to perform the step of transmitting the characteristic information of the user to the user terminal.

5. The permission management apparatus according to claim 1, wherein:

the instructions which when executed by the processor cause the processor to perform the step of receiving identification (ID) information of the first service card;

the memory stores the ID information of the first service card; and the instructions which when executed by the processor cause the processor to perform the step of transmitting to the user terminal the first ticket including the ID information of the first service card.

6. The permission management apparatus according to claim 5, wherein the ID information is a link identification number that is determined based on a number uniquely assigned to the first service card.

7. A permission management method executed by a computer, the permission management method comprising:

receiving, by the computer, from a user terminal, a use permission request requesting a first enablement state indicator be set to an enabled state, the first enablement state indicator: (i) being one of a plurality of enablement state indicators, and (ii) corresponding to a first service card associated with first identification information, the first service card being one of a plurality of services cards;

storing, by the computer: (i) registration information of each of the plurality of service cards in association with identification information, and (ii) permission information including the plurality of enablement state indicators corresponding one-to-one to the plurality of service cards, each of the plurality of enablement state indicators indicating whether the corresponding one of the plurality of service cards is enabled or disabled;

determining, by the computer, an enablement state of each of the plurality of enablement indicators;

responsive to determining that any one of the plurality of enablement state indicators other than the first enablement state indicator is set to the enabled state, maintaining, by the computer, the first enablement state indicator of the first service card in a disabled state, and (ii) responsive to determining that none of the plurality of enablement state indicators is enabled, changing, by the computer, the first enablement state indicator of the first service card from the disabled state to the enabled state for a predetermined period of time;

generating and transmitting, by the computer, a ticket to the user terminal, and storing, by the computer, the generated ticket in the memory in association with the first identification information, in response to the first enablement state indicator of the first service card being changed from the disabled state to the enabled state; and in response to receiving the ticket from an in-store device, verifying the ticket, by the computer, and transmitting, by the computer, to the in-store device, first permission information of the first service card based on the changed enablement state indicator of the first service card associated with the first identification information, the first permission information indicating that the first enablement state indicator of the first service card is enabled.

8. A non-transitory computer-readable recording medium having stored therein a permission management program which when executed by a computer causes the computer to perform the steps of:

receiving, by the computer, from a user terminal, a use permission request requesting a first enablement state indicator be set to an enabled state, the first enablement state indicator: (i) being one of a plurality of enablement state indicators, and (ii) corresponding to a first service card associated with first identification information, the first service card being one of a plurality of services cards;

storing, by the computer: (i) registration information of each of the plurality of service cards in association with identification information, and (ii) permission information including the plurality of enablement state indicators corresponding one-to-one to the plurality of service cards, each of the plurality of enablement state indicators indicating whether the corresponding one of the plurality of service cards is enabled or disabled;

determining, by the computer, an enablement state of each of the plurality of enablement indicators;

responsive to determining that any one of the plurality of enablement state indicators other than the first enablement state indicator is set to the enabled state, maintaining, by the computer, the first enablement state indicator of the first service card in a disabled state, and responsive to determining that none of the plurality of enablement state indicators is enabled, changing, by the computer, the first enablement state indicator of the first service card from the disabled state to the enabled state for a predetermined period of time;

generating and transmitting, by the computer, a ticket to the user terminal, and storing, by the computer, the generated ticket in the memory in association with the first identification information, in response to the first enablement state indicator of the first service card being changed from the disabled state to the enabled state; and in response to receiving the ticket from an in-store device, verifying the ticket, by the computer, and transmitting, by the computer, to the in-store device, first permission information of the first service card based on the changed enablement state indicator of the first service card associated with the first identification information, the first permission information indicating that the first enablement state indicator of the first service card is enabled.

* * * * *